United States Patent [19]

Pallini, Jr.

[11] Patent Number: 5,020,942

[45] Date of Patent: Jun. 4, 1991

[54] ALIGNMENT DEVICE FOR A TENSION LEG PLATFORM TENDON TOP CONNECTOR

[75] Inventor: Joseph W. Pallini, Jr., Tomball, Tex.

[73] Assignee: Vetco Gray Inc., Houston, Tex.

[21] Appl. No.: 546,091

[22] Filed: Jun. 29, 1990

[51] Int. Cl.$^5$ .............................................. E02B 17/06
[52] U.S. Cl. .................................... 405/224; 403/369; 405/195
[58] Field of Search ............... 405/224, 195, 204, 203; 403/321, 369; 285/141, 146, 139; 166/242, 243, 338, 340; 114/294, 297

[56] References Cited

U.S. PATENT DOCUMENTS

| | | | |
|---|---|---|---|
| 3,058,386 | 10/1962 | Morrow | 403/369 X |
| 3,957,381 | 5/1976 | Schafer | 403/369 X |
| 4,234,151 | 11/1980 | John et al. | 403/369 X |
| 4,611,953 | 9/1986 | Owens | 405/224 |
| 4,869,615 | 9/1989 | Galle | 405/224 X |
| 4,871,282 | 10/1989 | Jennings | 405/224 |
| 4,968,183 | 11/1990 | Hannus et al. | 405/203 X |

Primary Examiner—Dennis L. Taylor
Attorney, Agent, or Firm—James E. Bradley

[57] ABSTRACT

A tension leg platform top connector will connect a tendon to the platform. The top connector has a housing with a bore containing a conical shoulder. Several segments locate on the conical shoulder and will slide between an upper retracted position to an engaged position. In the engaged position, threads on the interior of the segments will engage threads formed on the exterior of the tendon. A cam plate will slide the segments down when the cam plate is rotated. A guide ring mounts outward of the segments. The guide ring has fingers that engage slots in the backs of each of the segments. The fingers and vertical slots allow the segments to move axially, but prevent them from rotating relative to the guide ring. A clutch ring applies a frictional force to the guide ring to resist rotation until the segments engage the tendon threads.

5 Claims, 3 Drawing Sheets

ALIGNMENT DEVICE FOR A TENSION LEG PLATFORM TENDON TOP CONNECTOR

BACKGROUND OF THE INVENTION

1. Field of the Invention:

This invention relates in general to tension leg platforms for offshore drilling, and in particular to a top connector for connecting the upper end of a tendon to the platform.

2. Description of the Prior Art:

A tension leg platform is a type of offshore drilling and production structure. The platform floats and is secured to the sea floor by tendons. The tendons are large pipes, about 20 inches in diameter. After securing the tendon to the platform and to the sea floor, ballast water is pumped out to cause the platform to rise. This is resisted by the tendons, placing the tendons under high tension load. The tendons under tension provide a stable platform for drilling and oil production.

In U.S. Pat. No. 4,871,282, Charles E. Jennings, Oct. 3, 1989, a connecting device is shown that will connect the top of the tendon to the platform. In that device, the upper end or terminal segment of the tendon has helical threads. The threaded section extends through a housing which has a conical bore. Segments, or dogs, will slide down the conical bore from a retracted position to an engaged position. The segments have mating threads which will engage the threads on the tendon. A cam ring causes the downward movement of the segments. The cam ring also will rotate the segments once in contact with the tendon to engage the threads of the segments with the threads of the tendon.

While the design shown in U.S. Pat. No. 4,871,282 is workable, it is important that the position of the thread helixes of the segments match each other in order for the segments to radially engage the threads of the tendon. If the threads do not match those of the other segments, either the relative axial location or circumferential positioning between the segments must be adjusted. Axial adjustment of the tendon relative to the housing is often impractical and difficult. Aligning the particular segments circumferentially can be time consuming in order to match the helical threads of the segments.

SUMMARY OF THE INVENTION

In this invention, a device is disclosed that provides a means of self circumferential alignment of the segments to allow them to match up to the tendon threads as the segments move to the engaged position. This device includes a guide ring which is mounted to the housing radially outward from the segments. The guide ring and the segments have a slot and finger means which cooperate to allow the segments to slide down the housing relative to the guide ring, but which prevent any rotation of any of the segments relative to the guide ring. This maintains uniform circumferential spacing between the segments.

The guide ring is mounted so that it will rotate relative to the housing. Once the segments contact the threads on the tendon, the cam ring will rotate the segments and the ring to make a full engagement.

A clutch ring serves as means for applying a frictional force to the guide ring. This frictional force tends to prevent the segments from rotating while the cam ring rotates. This frictional force is overcome, however, once the segments engage the threads of the tendon, allowing the segments to be rotated.

DETAILED DESCRIPTION OF THE INVENTION

Figure 1:
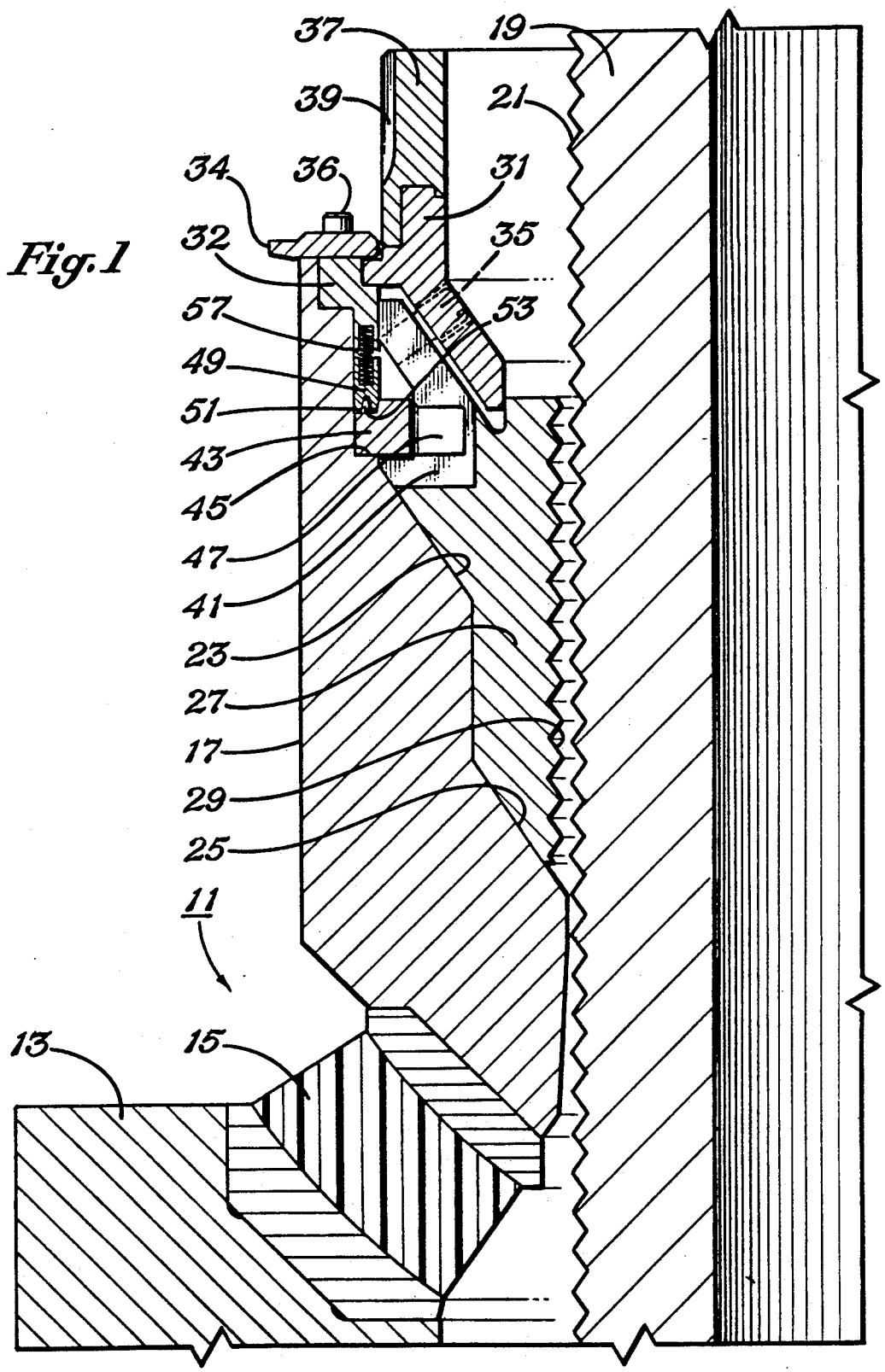
FIG. 1 is a vertical quarter sectional view of a top connector for a tension leg platform, constructed in accordance with this invention.

Referring to FIG. 1, the top connector 11 will be mounted to a tension leg platform (not shown) at the bottom of a column of the platform. The top connector 11 includes a base 13. Flexible elements 15 are mounted to the base 13. Flexible elements 15 are a combination of thermoplastic with metal plates. A housing 17 secures to the flexible elements 15. The flexible elements 15 allow the housing 17 to twist and move angularly with wave movement.

The upper end of a tendon 19 extends upward through housing 17. The upper end of tendon 19, also called a terminal segment, has a plurality of helical exterior threads 21. Housing 17 has an axial bore with two frusto-conical shoulders 23, 25. Shoulders 23, 25 incline relative to the vertical axis of housing 17. Shoulders 23, 25 are separated by a cylindrical portion in the bore of housing 17.

Figure 2:
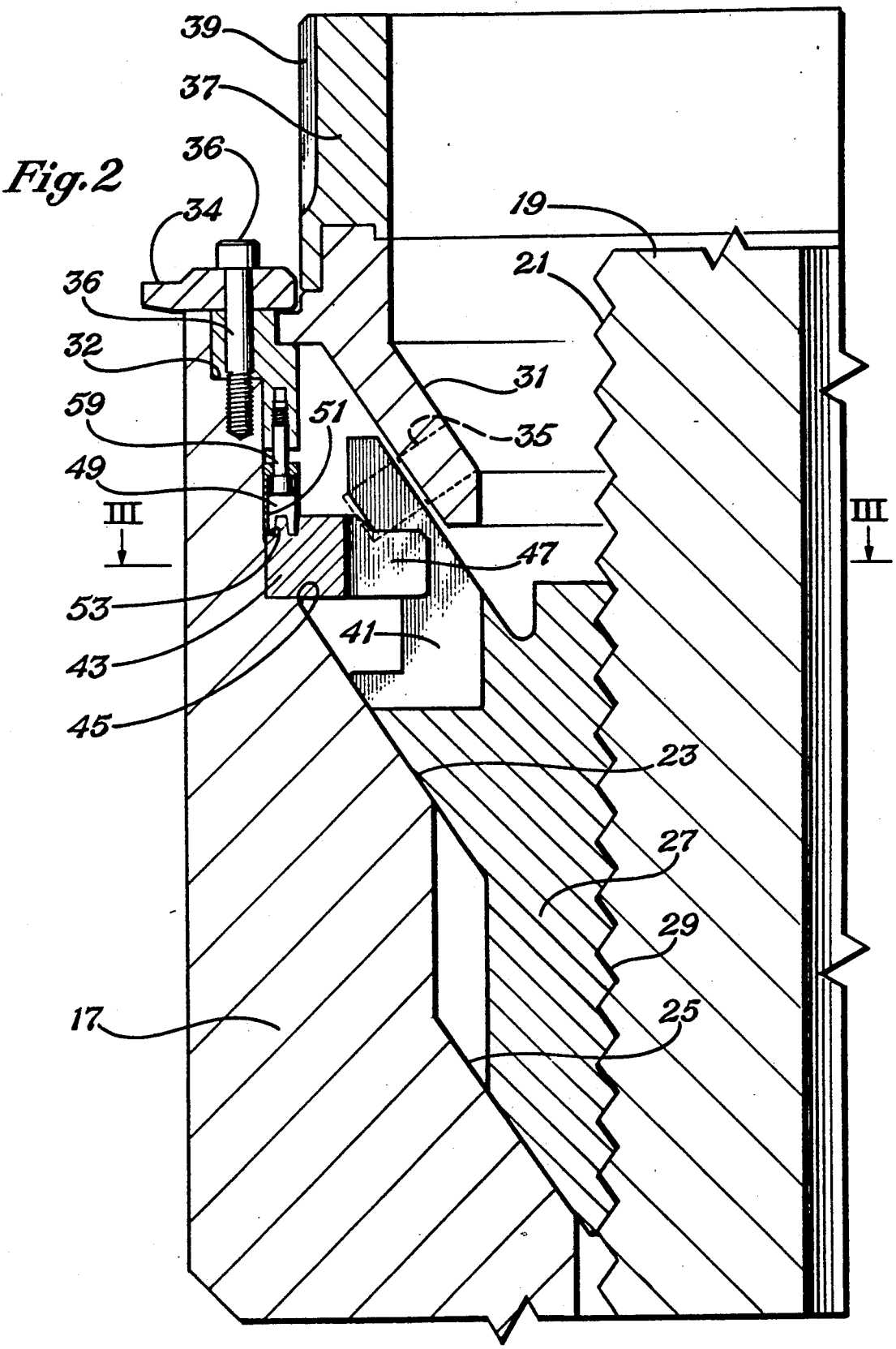
FIG. 2 is an enlarged, partial sectional view of the top connector of FIG. 1, and taken along a different vertical plane from that shown in FIG. 1.

Four separate dogs or segments 27 are carried on the shoulders 23, 25. The segments 27 make up a split nut which will secure to the external threads 21 of tendon 19. Each segment 27 has conical surfaces that slidingly mate with the shoulders 23, 25. Each segment 27 has internal threads 29 that are formed to mate with the threads 21 on the tendon 19. Segments 27 will slide between an upper retracted position, shown in FIG. 1, to a lower engaged position, shown in FIG. 2.

A cam ring 31 serves as actuating means for moving the segments 27 between the retracted and engaged positions. Cam ring 31 has an external flange carried in a groove which is defined by a support ring 32 and a retaining ring 34. Bolts 36 hold the support ring 32 and retaining ring 34 stationary relative to the housing 17. The cam ring 31 will rotate relative to the housing 17.

Figure 4:
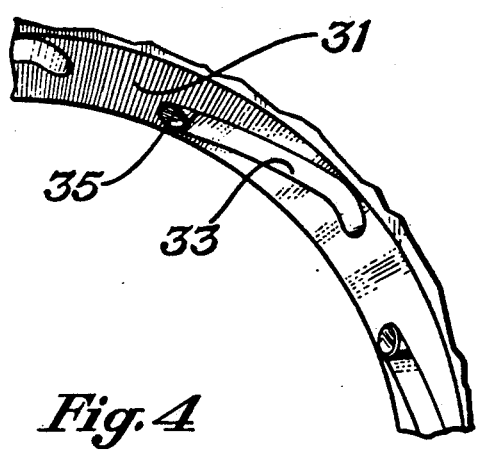
FIG. 4 is a top view of a portion of the cam ring of the top connector of FIG. 1.

Cam ring 31 has a plurality of cam slots 33 formed in it, as shown in FIG. 4. These cam slots 33 extend circumferentially and also incline axially a selected distance. A pin 35 for each of the cam slots 33 is fixed to each of the segments 27. The pin 35 and the cam slots 33 will cause the segments 27 to move axially as the cam ring 31 rotates. This occurs due to the relative positioning of the pin 35 from near an upper end to near a lower end of the cam slot 33. Also, when the segment threads 29 contact the tendon threads 21, the friction causes further rotational movement of cam ring 11 to rotate the segments 27 relative to the housing 17. A drive ring 37 mounted to the cam ring 31 has splines 39. The splines 39 will receive a hydraulically powered tool (not shown) for causing rotation of the cam ring 31.

Figure 3:
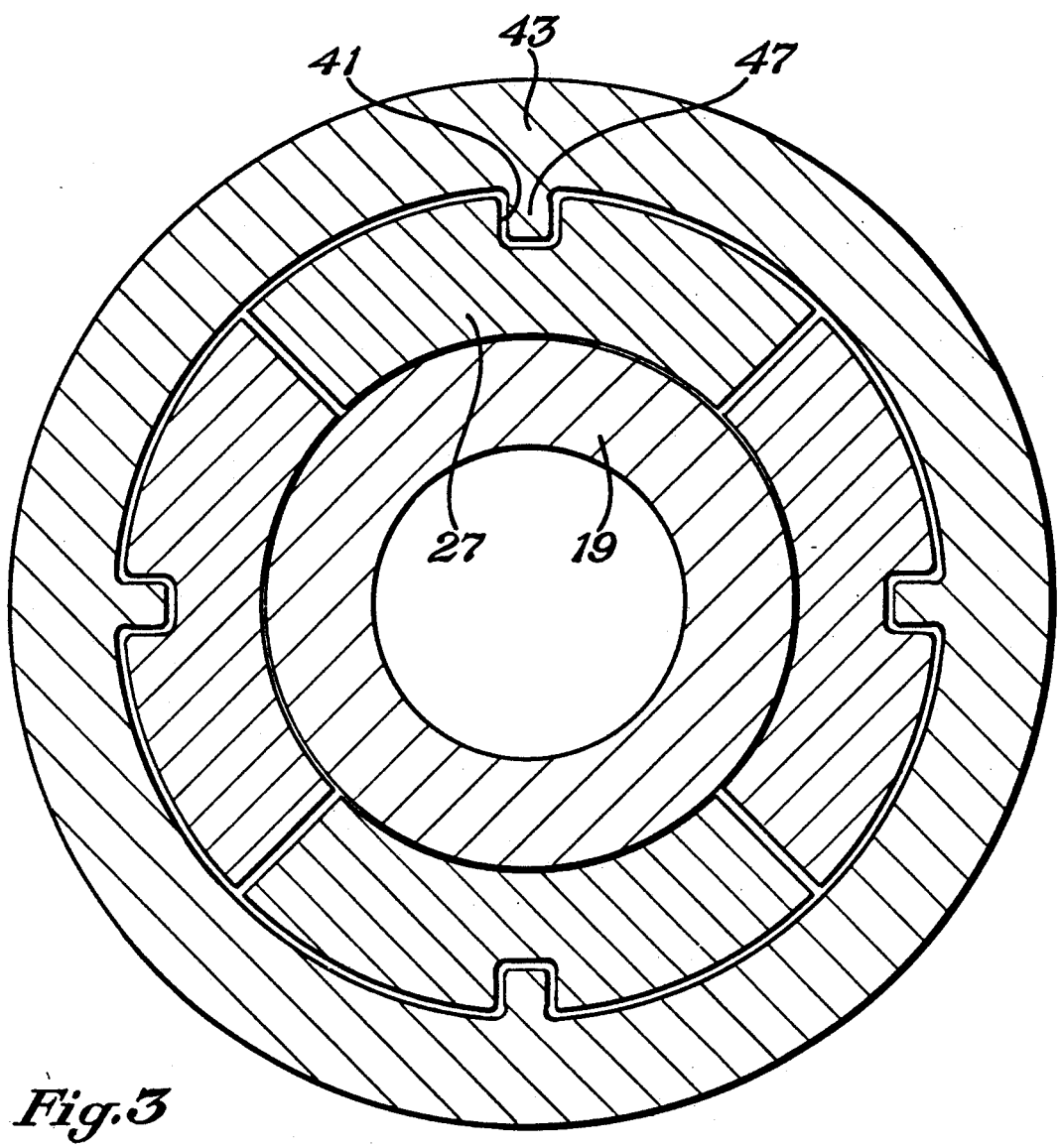
FIG. 3 is a transverse sectional view of the top connector of FIG. 1, taken along the line III—III of FIG. 2, and with the housing shown removed.

Each of the segments 27 has an axially extending slot 41 formed on its outer surface or side. Slot 41, shown also in FIG. 3, is located in the center of each segment 27. A guide ring 43 locates radially outward from the slots 41. Guide ring 43 is carried for sliding movement on a shoulder 45 located in the bore of housing 17. Shoulder 45 faces upward and is perpendicular to the axis of housing 17.

Guide ring 43, shown also in FIG. 3, has a plurality of fingers 47. Each finger 47 extends radially inward from an inner side of the guide ring 43 and slidingly engages one of the slots 41. The fingers 47 and slots 41 will allow the segments 27 to move axially relative to the guide ring 43. This can be seen by comparing FIG. 1 with FIG. 2. However, the fingers 47 and slots 41 will not allow any rotational movement of any of the segments 27 relative to the guide ring 43. In this manner, the spacing circumferentially between each of the segments 27 remains even as the segments 27 slide downward and inward on the conical shoulders 23, 25.

The device also has means for applying a frictional force to the guide ring 43 to cause it to resist rotation until a sufficient force is applied. In the preferred embodiment, this comprises a clutch ring 49. The clutch ring 49 is an annular member mounted on top of the guide ring 43. The clutch ring 49 has a pair of legs 51 which engage a pair of annular grooves 53 formed in the upper side of the guide ring 43. The legs 51 are annular members which will frictionally engage the surfaces of the grooves 53 to apply frictional force.

A spring means applies a downward force to the clutch ring 49. This includes a plurality of coil springs 57. The coil springs 57 are compressed between the clutch ring 49 and the fixed support ring 32. Each spring 57 has an upper end located in a downward facing hole formed in the support ring. The lower end of each spring 57 locates in an upward facing hole formed in the clutch ring 49. The springs 57 apply a downward force on the clutch ring 49 to increase friction between the legs 51 and the grooves 53.

The clutch ring 49 does not rotate. The springs 57 are alternated with bolts 59, shown in FIG. 2. Each bolt 59 secures by threads in a hole in the support ring 32. The head of each bolt 59 locates in a lower enlarged area within a hole in the clutch ring 49. Bolts 59 will allow axial movement of the clutch ring 49 relative to the support ring 32, but will not allow any rotational movement of the clutch ring 49 relative to the support ring 32.

In operation, a crane (not shown) Will hold the upper end of the tendon 19 while the base 13, housing 17, and related equipment are lowered into place in the position shown in FIG. 1. Water in buoyancy tanks in the platform will locate the housing 17 at the approximate proper point relative to the upper end of tendon 19.

Then, a hydraulic tool will rotate the cam ring 31. Initially, the cam ring 31 will rotate relative to the segments 27. The force of the clutch ring 49 on the guide ring 43 will prevent any rotation of the segments 27 as the cam slots 33 (FIG. 4) move relative to the pins 35. The segments 27 will slide downward as the cam slots 33 move relative to the pins 35. Before the pins 35 reach the lower ends of the cam slots 33, the segments 27 will touch the threads 21 of the tendon 19.

While in the retracted position, there will be gaps between the side edges of the segments 27. These gaps will narrow as the segments 27 slide down the conical shoulders 23, 25 because of the radial inward movement of the segments along with the axial movement. The fingers 47 will maintain the gaps equal to each other as the segments 27 move downward.

It is likely that the threads 29 of the segments 27 will not mesh with the threads 21 of the tendon 19 when initially touching the threads 21. Continued rotation of the cam ring 31 will then cause the 16 segments 27 to rotate in the housing 17. The frictional force of the clutch ring 49 against the guide ring 43 will be overcome by the rotational force imposed on the segments 27 by the cam ring 31. The guide ring 43 will rotate with the segments 27. After less than one turn, the threads 21, 29 will mesh. The side edges of the segments 27 will be substantially in contact with each other. The segments 27 will be in the position in FIG. 2.

A locking assembly as described in U.S. Pat. No. 4,871,282 may then be installed. Water can then be pumped out of buoyancy tanks on the platform to apply the desired amount of tension in the tendons 19. If it is desired to release the connector 11, the operation described above can be reversed.

The invention has significant advantages. The guide ring maintains even distances between the segments as they slide down the conical bore. The clutch ring prevents rotation of the segments until the the segments engage the tendon threads.

While the invention has been shown in only one of its forms, it should be apparent to those skilled in the art that it is not so limited, but is susceptible to various changes without departing from the scope of the invention.

I claim:

1. In a floating platform having a plurality of tendons, each extending in tension from the sea floor through an axial bore of a housing carried by the platform, the bore having a conical shoulder which carries a plurality of segments, each segment having interior threads for engaging exterior threads formed on each tendon, and actuating means for causing each segment to slide down the conical shoulder and rotate into engagement with the threads of the tendon, an improvement comprising in combination:

a guide ring mounted to the housing radially outward from the segments and having an interior surface that opposes an exterior surface on each of the segments;

a slot on one of said surfaces for each of the segments; and a plurality of fingers, each protruding from the other of said surfaces and extending into one of the slots for maintaining circumferential spacing of the segments relative to each other as the actuating means is rotated; and the guide ring being rotatable relative to the housing to allow rotation of the segments on the conical shoulder when sufficient rotational force by the actuating means is applied to the segments.

2. In a floating platform having a plurality of tendons, each extending in tension from the sea floor through an axial bore of a housing carried by the platform, the bore having a conical shoulder which carries a plurality of segments, each segment having interior threads for engaging exterior threads formed on each tendon, and actuating means for causing each segment to slide down the conical shoulder and rotate into threaded engagement with the threads of the tendon, an improvement comprising in combination:

a guide ring carried by the housing radially outward from the segments and having an interior surface that opposes an exterior surface on each of the segments;

an axially extending slot on one of said surfaces for each of the segments;

a plurality of fingers, each protruding radially from the other of said surfaces and extending into one of the slots for maintaining circumferential spacing of the segments relative to each other as the actuating means is rotated;

mounting means for mounting the guide ring to the housing for preventing any axial movement of the guide ring relative to the housing but for allowing rotation of the guide ring relative to the housing along with the segments as the actuating means rotates the segments after the segments contact the threads of the tendon; and bias means for applying a frictional force to the guide ring to cause the segments to resist rotation with the actuating means until the segments are in contact with the threads of the tendon.

3. In a floating platform having a plurality of tendons, each extending in tension from the sea floor through an axial bore of a housing carried by the platform, the bore having a conical shoulder which carries a plurality of segments, each segment having interior threads for engaging exterior threads formed on each tendon, and a cam ring for causing each segment to slide down the conical shoulder and rotate into threaded engagement with the threads of the tendon, an improvement comprising in combination:

a guide ring carried by the housing radially outward from the segments and having an interior surface that opposes an exterior surface on each of the segments;

an axially extending slot for each of the segments located on one of said surfaces;

a plurality of fingers, each protruding radially from the other of said surfaces and extending into one of the slots for maintaining circumferential spacing of the segments relative to each other as the cam ring is rotated;

mounting means for mounting the guide ring to the housing for preventing any axial movement of the guide ring relative to the housing but for allowing rotation of the guide ring relative to the housing along with the segments as the cam ring rotates the segments after the segments contact the threads of the tendon;

a clutch ring having a surface frictionally engaging the guide ring; and means for preventing rotation of the clutch ring relative to the housing and for urging the clutch ring against the guide ring for applying a frictional force to the guide ring to cause the segments to resist rotation with the cam ring until the segments are in contact with the threads of the tendon.

4. In a floating platform having a plurality of tendons, each extending in tension from the sea floor through an axial bore of a housing carried by the platform, the bore having a conical shoulder which carries a plurality of segments, each segment having interior threads for engaging exterior threads formed on each tendon, and an actuating means for causing each segment to slide down the conical shoulder and rotate into threaded engagement with the grooves of the tendon, an improvement comprising in combination:

an annular upward facing shoulder located in the bore of the housing;

a guide ring slidably carried on the shoulder;

cooperative means on the guide ring and on the segments for preventing rotation of the segments relative to the guide ring but allowing the segments to move axially on the conical shoulder relative to the guide ring;

a clutch ring having a surface frictionally engaging the guide ring; and spring means mounted to the housing in engagement with the clutch ring for preventing rotation of the clutch ring relative to the housing and for urging the clutch ring against the guide ring for applying a frictional force to the guide ring to cause the segments to resist rotation with the actuating means until the segments are in contact with the threads of the tendon.

5. In a floating platform having a plurality of tendons, each extending in tension from the sea floor through an axial bore of a housing carried by the platform, the bore having a conical shoulder which carries a plurality of segments, each segment having interior threads for engaging exterior threads formed on each tendon, and a cam ring for causing each segment to slide down the conical shoulder and rotate into threaded engagement with the threads of the tendon, an improvement comprising in combination:

an annular upward facing shoulder located in the bore of the housing;

a guide ring slidably carried on the shoulder;

an axially extending slot located on each of the segments;

a plurality of fingers on the guide ring, each protruding radially inward from the guide ring into one of the slots for maintaining circumferential spacing of the segments relative to each other as the cam ring is rotated;

a clutch ring having a surface frictionally engaging the guide ring; and at least one spring carried by the housing and compressed against the clutch ring for preventing rotation of the clutch ring relative to the housing and for urging the clutch ring against the guide ring for applying a frictional force to the guide ring to cause the segments to resist rotation with the cam ring until the segments are in contact with the threads of the tendon.

* * * * *